(12) United States Patent
Hein

(10) Patent No.: US 9,540,157 B2
(45) Date of Patent: Jan. 10, 2017

(54) CLOSURE STRAP

(75) Inventor: Klaus Hein, Gedern (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 84 days.

(21) Appl. No.: 14/116,753

(22) PCT Filed: May 9, 2012

(86) PCT No.: PCT/EP2012/058552
§ 371 (c)(1),
(2), (4) Date: Dec. 4, 2013

(87) PCT Pub. No.: WO2012/152834
PCT Pub. Date: Nov. 15, 2012

(65) Prior Publication Data
US 2014/0115831 A1    May 1, 2014

(30) Foreign Application Priority Data

May 9, 2011  (EP) .................................... 11003787

(51) Int. Cl.
*B65D 63/16*    (2006.01)
*B65D 63/10*    (2006.01)
(Continued)

(52) U.S. Cl.
CPC ........... *B65D 63/1027* (2013.01); *A22C 11/12* (2013.01); *B65D 33/1616* (2013.01); *Y10T 24/153* (2015.01)

(58) Field of Classification Search
CPC ............... Y10T 24/153; B65D 33/1616; B65D 63/1018; B65D 63/1027; B65D 63/1036; B65D 63/1063; B65B 51/04; B65B 51/08
(Continued)

(56) References Cited

U.S. PATENT DOCUMENTS 2,935,773 A * 5/1960 Weckesser .................... 24/17 R
3,086,265 A    4/1963 Orenick et al.
(Continued)

FOREIGN PATENT DOCUMENTS

CA    2435500 A1    1/2005
CN    201161759 Y    12/2008
(Continued)

OTHER PUBLICATIONS

PCT/EP2012/058552—International Search Report and Written Opinion dated Nov. 16, 2012, 9 pgs.
(Continued)

*Primary Examiner* — Jack W Lavinder
(74) *Attorney, Agent, or Firm* — Fitch, Even, Tabin & Flannery LLP

(57) ABSTRACT

The present invention relates to a closure strap for closing packages having a bag-shaped or tubular form, in particular for closing sausage-shaped packages, like sausages. The closure strap comprises a strap body including an elongated stripe portion having a first end and a second end, and an insertion portion having a first end, a second end and an insertion channel. The second end of the insertion portion is connected with the first end of the stripe portion. The second end of the stripe portion forms an insertion end for being inserted into the insertion channel of the insertion portion in an insertion direction. The second or insertion end of the stripe portion and the insertion channel have a substantially round cross section corresponding to each other.

19 Claims, 1 Drawing Sheet

(51) Int. Cl.
*A22C 11/12* (2006.01)
*B65D 33/16* (2006.01)

(58) Field of Classification Search
USPC ............... 24/30.51, 30.5 P, 17 AP, 271, 272
See application file for complete search history.

(56) References Cited

U.S. PATENT DOCUMENTS

| | | | |
|---|---|---|---|
| 3,114,184 | A | 12/1963 | Bigaouette |
| 3,735,448 | A | 5/1973 | Waddington |
| 3,816,879 | A | 6/1974 | Merser et al. |
| 3,855,670 | A | 12/1974 | Brudy |
| 4,223,424 | A | 9/1980 | Burnett |
| D380,375 | S | 7/1997 | Rohaly et al. |
| 5,836,054 | A | 11/1998 | Alexander |
| 6,003,208 | A | 12/1999 | Christian et al. |
| 6,467,132 | B1* | 10/2002 | Robley ............... 24/16 PB |
| 6,681,451 | B1 | 1/2004 | Adams et al. |
| 2002/0152588 | A1 | 10/2002 | Robley |
| 2003/0154574 | A1 | 8/2003 | Hatch |
| 2005/0241116 | A1* | 11/2005 | Stewart et al. ............ 24/16 PB |
| 2010/0125979 | A1 | 5/2010 | Hienekamp |

FOREIGN PATENT DOCUMENTS

| | | |
|---|---|---|
| CN | 201362431 Y | 12/2009 |
| JP | 52-95792 | 7/1977 |
| WO | 02053923 A2 | 7/2002 |
| WO | 2008-027042 A1 | 3/2008 |
| WO | 2009-043886 A1 | 4/2009 |

OTHER PUBLICATIONS

Communication from a foreign patent office citing JP341590 in a counterpart foreign application, received Oct. 31, 2014.

Office Action issued in corresponding Chinese Application No. 201280033994.6 dated Jul. 31, 2015 and English translation of same (15 pages).

Rounded Rectangle, Wolfram Math World, http://mathworld.wolfram.com/RoundedRectangle.html (1 page).

Office Action issued in corresponding Chinese Application No. 201280033994.6 dated Feb. 15, 2016 and English translation of same (19 pages).

Opposition writ filed in corresponding European Application No. 11003787.6 dated Dec. 11, 2015 (31 pages).

* cited by examiner

CLOSURE STRAP

This application is a National Stage entry of International Application No. PCT/EP2012/058552, filed May 9, 2012, which claims priority to European Patent Application No. 11003787.6 filed May 9, 2011 with the European Patent Office, each of which are hereby incorporated by reference.

BACKGROUND OF THE INVENTION

The present invention relates to a closure strap for closing packages having a bag-shaped or tubular form, in particular sausage-shaped products, like sausages, according to claim 1.

In particular, the present invention relates to a closure strap for closing packages having a bag-shaped or tubular form, in particular for closing sausage-shaped products, like sausages. The closure strap comprises a strap body including an elongated stripe portion having a first end and a second end, and an insertion portion having a first end, a second end and an insertion channel, wherein the second end of the insertion portion is connected with the first end of the stripe portion. The second end of the stripe portion forms an insertion end for being inserted into the insertion channel of the insertion portion in an insertion direction.

In the practice, it is known to close packages having a tubular or bag-like form by gathering the casing or bag material, forming a neck portion and applying a closure means, like a closure strap, to said neck portion.

A closure strap of this kind for closing bags and the like is disclosed in U.S. Pat. No. 3,114,184. This known closure comprises a flat body having on its one end a generally circular part and a longitudinal band portion coupled to the circular part and extending to the second end of the flat body. The circular part of the closure strap comprises a slot extending vertically to the extension of the longitudinal band portion. Teeth form transversely aligned shoulders which are provided at the longitudinal edges of the band portion having a longitudinal slot provided between said shoulders. For closing a bag, the closure strap surrounds a gathered neck portion of said bag. The free end of the longitudinal band portion is inserted into the slot of the circular part the cross-section of which coincides with the cross-section of the band portion. By pulling the band portion through the slot, the teeth passing said slot, whereby they are pushed together about the width of the longitudinal slot in the band portion. After having passed the slot, the teeth spread back into their former position and engage the opposite side of the circular portion, thereby holding the closure strap in its closed configuration.

This known closure strap is of a substantially flat configuration with a relatively big width so that a relatively long neck portion has to be formed to the bag to be closed and the closing force provided by said closure strap has to act on said long neck portion, accordingly. To assure a save and reliable closing of said bag, a respectively high force has to be provided by said closure strap. Moreover, both ends of said closure strap, and in particular the free end of the longitudinal band portion having sharp edges, extend from the closed bag. In case of a relative strong strap material, other bags positioned adjacent to said strap may be damaged when made of a sensitive material and/or tightly filled.

Thus, it is an object of the present invention to provide a closure strap with which the above mentioned drawbacks can be overcome and with which a save and reliable closure of tubular or bag-shaped packages is assured without requiring much space.

SUMMARY OF THE INVENTION

The aforesaid object is achieved by the features of independent claim 1. Advantageous configurations of the inventive closure strap are described in claims 2 to 11.

According to the present invention, there is provided a closure strap for closing packages having a bag-shaped or tubular form, in particular sausage-shaped packages, like sausages. The closure strap comprises a strap body including an elongated stripe portion having a first end and a second end, and an insertion portion having a first end, a second end and an insertion channel. The second end of the insertion portion is connected with the first end of the stripe portion, and the second end of the stripe portion forms an insertion end for being inserted into the insertion channel of the insertion portion in an insertion direction.

In an inventive configuration, the insertion end of the stripe portion and the insertion channel, both have a substantially round cross section corresponding to each other. In this configuration, the contact area between the closure strap and the neck portion of the tubular or bag-shaped package is approximately restricted to a line surrounding the gathered neck portion. Thereby, the closing force for securely and reliably closing said package may be reduced and, in case of sensitive package material, damages to the tubular or bag-shaped package are avoided.

In a further advantageous configuration of the closure strap, the second end of the insertion portion is connected to the first end of the stripe portion by a curved portion. The insertion portion and the stripe portion thereby form a curvature which allows the closure strap a more accurate surrounding of the neck portion of the tubular or bag-shaped packing to be closed.

The insertion channel for inserting the insertion stripe into the insertion portion may be arranged in the insertion portion in various directions. According to one embodiment of the present invention, the insertion channel extends between the first and second end of the insertion portion, whereby, when used, said insertion channel is aligned in a circumferential direction around the neck portion of the package to be closed. The insertion stripe extending through the insertion portion and projecting from the closure strap in its closed configuration is also aligned in a circumferential direction around the neck portion of the closed package, whereby damages of other packages by said insertion stripe is avoided.

The insertion portion of the inventive closure strap includes a first surface positioned at its first end. Said first surface forms an end face of the closure strap. In this embodiment, one end of the insertion channel coincides with the first surface of the insertion portion. That means, the insertion channel starts at said end face, thereby facilitating the circumferential orientation of the insertion channel and thus, the respective orientation of the stripe portion.

In a preferred embodiment of the closure strap, the insertion channel terminates or opens at the inner surface of the closure strap. In the closed configuration of the closure strap, the second end of the stripe portion or insertion end can freely step out from the insertation channel and can extend inside the closed strap towards the neck portion of the package to be closed. Thus, damages of other packages by said stripe portion, in particular, the insertion end, is omitted and, due to the additional stripe material inside the closed strap, the closing force increases.

In a further advantageous embodiment of the inventive closure strap, the insertion end of the stripe portion has an outer end radius mating the inner radius of the curved portion. Thereby, a defined inner diameter of the closure strap is provided when it is in its closed configuration. Moreover, the mating radii prevent the package material inside the closed strap from being damaged by the insertion end.

In order to assure a save closing of the closure strap, the stripe portion comprises at least in the region of its insertion end notches on its outer surface for holding the closure strap in its closed configuration.

To enhance the save closing of the closure strap, counter notches are provided at the inner surface of the insertion channel. Said counter notches may engage the notches provided in the region of the insertion end of the stripe portion for holding the strap in its closed configuration and for maintaining a respective closing force. Said counter notches may be provided by cuttings or recesses incorporated into the insertion portion.

The cross section of the closure strap, and in particular, of the stripe portion may have any suitable form. In an advantageous configuration, the stripe portion has a substantially elliptical cross-section for forming a linear contact area between the neck portion of the tubular or bag-shaped package and the closure strap surrounding the neck portion. It has to be understood, that the stripe portion and the insertation end may have different cross-sections, e.g. in order to provide mating radii of the curved portion and the insertion end.

Further advantages and a preferred embodiment will be described in the following together with the drawings listed below. The expressions "left", "right", "below" and "above" used in the below description, are referred to the drawings in an alignment such that the reference numbers used can be read in normal.

DETAILED DESCRIPTION

Figure 1:
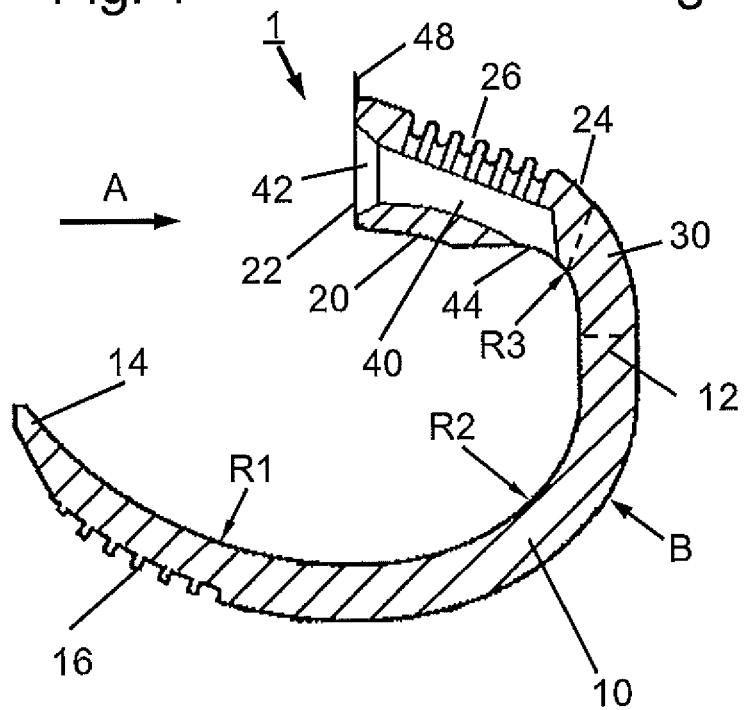
FIG. 1: is a schematical view onto a cross-section of a closure strap according to the present invention in an opened configuration.

FIG. 1 shows a schematical view onto the cross-section of an embodiment of a closure strap 1 according to the present invention in an opened configuration in a plane of the main extension of closure strap 1. Closure strap 1 has a strap body B which includes an elongated and bent stripe portion 10 being elastically movable between an opened position shown in FIG. 1 and a closed position shown in FIG. 3, and an insertion portion 20 extending substantially straight. Stripe portion 10 has a first end 12 marked with a dotted line, and a second end 14. Insertion portion 20 has a first end 22 and a second end 24 also marked with a dotted line. Stripe portion 10 and insertion portion 20 can be connected directly. In the present embodiment according to FIGS. 1 to 3, stripe portion 10 and insertion portion 20 are connected by a curved portion 30 which is arranged between stripe portion 10 and insertion portion 20 wherein stripe portion 10 continues the curvature of the curved portion 30, but probably with a different radius in the opened configuration of closure strap 1. Stripe portion 10, insertion portion 20 and curved portion 30 are integrally formed for forming the strap body B. Moreover, curved portion 30 connects the first end 12 of stripe portion 10 to the second end 24 of insertion portion 20 also marked by a dotted line. According to the embodiment of FIG. 1, starting from second end 14 of stripe portion 10, radius of curved strap body B varies from a radius R1 via radius R2 in the region of first end 12 of strip portion 10 to a radius R3, which is the inner radius of curved portion 30. Radius R1 is constant over a large portion of stripe portion 10 starting from its second end 14, followed by radius R2 of the remaining section of stripe portion 10 up to its first end 12, which is smaller than radius R1, and, finally, radius R3 of curved portion 30 is smaller than radius R2.

As it can be seen in FIG. 1, second end 14 of stripe portion 10 tapers towards its free tip end, formed by a skewing outer surface. In the direction towards first end 12 of stripe portion 10, following the tapered second end 14, notches 16 provided at the outer surface of stripe portion 10. Notches 16, according to FIG. 1, have parallel flanges or side surfaces forming an approximately rectangular cross-section to said notches 16 which extend nearly vertically from stripe portion 10. Notches 16 are formed by partially leaving out stripe material in regular intervals from the outer surface of stripe portion 10. It has to be understood, that said notches 16 may also be formed by placing additional material at regular intervals on the outer surface of stripe portion 10. Notches 16 are integrally formed by producing closure strap 1, e.g. by casting a respective plastic material. Between first end 12 and second end 14, except the tapered end, stripe portion 10 has an at least approximately constant cross-section, which is, according to the embodiment of FIGS. 1 to 3, at least approximately circular, as shown by cross-section C in FIG. 3.

Figure 2:
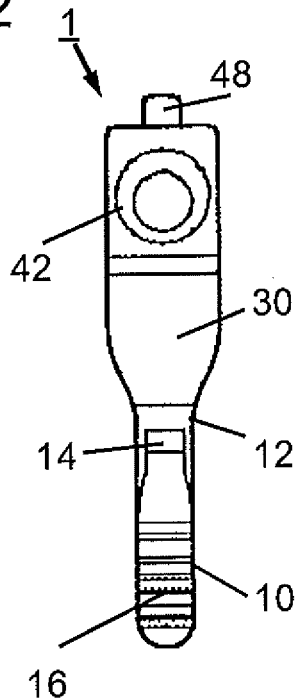
FIG. 2: is a schematical view onto the closure strap of FIG. 1 seen in the closing direction of arrow A.

FIG. 2 is a schematically view to the closure strap of FIG. 1 seen in the insertion direction of arrow A. As it can be seen in FIG. 2, second end or insertion end 14 also tapers at its side surfaces. Thereby, tapering second end 14 has an approximately cone shape.

As it further can be seen in FIG. 1, insertion portion 20 is provided with an insertion channel 40. Insertion channel 40 extends between first end 22 and second end 24 of insertion portion 20. Insertion channel 40 has a first or insertion opening 42 and starts at first end 22 of insertion portion 20, which forms an insertion surface or first surface of said insertion portion 20 opposite to the second end 24 of insertion portion 20. Insertion channel 40 terminates in an exit opening 44 which is arranged at the second end 24 of insertion portion 20. Exit opening 44 is directed to the inside of closure strap 1, that means that exit opening 44 is directed towards the neck portion of the tubular or bag-shaped package to be closed by closure strap 1. For facilitating the insertion of stripe portion 10, in particular first end 14 which forms the insertion end, insertion opening 42 of insertion channel 40 has a funnel-shaped section. It has to be understood that the cross-section of insertion channel 40 corresponds to the cross-section of stripe portion 10. In the present embodiment, insertion channel 40 has an approximately circular cross-section.

Insertion portion 20 has an approximately rectangular cross-section tapering from its first end 22 towards its second end 24, including parallel side surfaces and a planar outer surface. The inner surface of insertion portion 20, facing the neck portion of the package to be closed, when closure strap 1 is in the closed configuration, is curved to enhance the contact to the neck portion of the closed package.

As shown in FIG. 1, counter notches 26 are provided at the outside of insertion portion 20 and simultaneously at the inner side of insertation channel 40. For forming counter notches 26, cuttings or recesses are incorporated into the insertion portion 20. Said cuttings or recesses extend from the outer surface of insertion portion 20 towards insertion channel 40 and terminate in insertion channel 40. The gap between two succeeding counter notches 26 coincides with the distance between two succeeding notches 16 provided on the outer surface of stripe portion 10. Moreover, the number of counter notches 26 is at least equal to the number of notches 16 of stripe portion 10. For closure strap 1 to be adaptable to different diameters of neck portions of packages to be closed, e.g. dependent on the package material and/or the diameter of the filled packages, the number of notches 16 may exceed the number of counter notches 26 provided in insertion portion 20.

As it further can be seen in FIG. 1, a section of the inner surface of insertion channel 40 facing the inside of closure strap 1, is curved in a manner reducing the cross-section area of insertion channel 40 in its central region. This reduction in diameter of insertion channel 40 enhances the engagement of notches 16 into counter notches 26, when closure strap 1 is in its closed configuration.

To allow an easy handling, in particular for holding closure strap 1 in a defined position, a lug 48 is formed on insertion portion 20, extending in the plane of first surface 22 from the outside thereof. Lug 48 may be used to position closure strap 1 in a filling machine, thereby enabling a mechanical or automatically closing of closure strap 1 in said filling machine.

Figure 3:
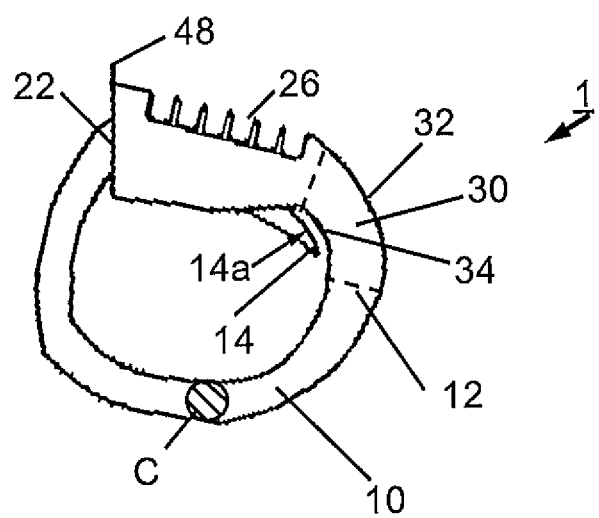
FIG. 3: is a schematical view onto the closure strap of FIG. 1 in its closed configuration.

According to the embodiment of closure strap 1 shown in FIGS. 1 to 3, stripe portion 10 is coupled to insertion portion 20 by curved portion 30; in particular, first end 12 of stripe portion 10 is coupled to second end 24 of insertion portion 20 by curved portion 30. The cross-section of first end 12 of stripe portion is at least approximately circular, whereas the cross-section of the second end 24 of insertion portion 20 is approximately rectangular. Accordingly, curved section 30 has a non-constant cross-section, changing from a circular shape at one end, to which first end 12 of stripe portion 10 is attached, into an approximately rectangular shape at its respective other end, which coincides to the cross-section of second end 24 of insertion portion 20, to which it is connected.

FIG. 3 shows closure strap 1 in its closed configuration. Stripe portion 10 is inserted into insertion channel 40 of insertion portion 20. Stripe portion 10 extends through insertion channel 40, whereby insertion end 14 of stripe portion 10 projects from insertion portion 20 through exit opening 44 to the inside of closure strap 1. It has to be understood that the length of stripe portion 10, and in particular of insertion end 14, extending through exit opening 44 into closure strap 1 when in its closed configuration, depends on the diameter of the neck portion of the package to be closed. Thus, in case of a large diameter of the neck portion, insertion end 14 of stripe portion 10 not necessarily extends through exit opening 44 of insertion channel 40.

As it further can be seen, in particular in FIG. 3, insertion end 14 has an outer radius 14a formed by the skewing outer surface of said tapering insertion end 14. The outer radius 14a of insertion end 14 at least approximately corresponds to the inner radius R3 of curved portion 30.

Tubular or bag-shaped packages are used for forming e.g. sausage-shaped products, like sausages. Thereby, a filling material, like sausage meat, is fed into said tubular or bag-shaped package which is closed by a closing means, like a closure strap. For closing the tubular or bag-shaped package, a neck portion is formed to the at least one open end of the filled package. Closure strap 1 is positioned with its inside at said neck portion, e.g. held by lug 48, and insertion end 14 is guided in the insertion direction A into insertion channel 40, whereby closure strap 1 forms a ring surrounding the neck portion of the tubular or bag-shaped package. Stripe portion 10 is further pushed in insertion direction A into insertion channel 40, reducing the diameter of the ring-shaped closure strap 1 and providing a closure force to the neck portion. Thereby, notches 16 of stripe portion 10 engage counter notches 26 in insertion portion 20, holding closure strap 1 in its closed configuration at the neck portion of the tubular or bag-shaped package wherein the elastic character of the material of the inventive closure strap 1 strengthens the mating of the notches 16 with the counter notches 26 due to the fact that it forces the insertation and 14 of stripe portion 10 to the outride. Thus, the e closure force is maintained and prevents closure strap 1 from being opened. Thereby, an irreversible closing of closure strap 1 is reached. But, at least, a self-activated or an accidental opening is prevented.

By closing closure strap 1, the free end or insertion end 14 of stripe portion 10 extends through exit opening 44 into the closed strap 1. The additional strap material accelerates the reduction of the inner diameter in relation to the outer diameter, whereby the closure force disproportionally increases.

It has to be understood that, for closing tubular packages, both ends of the tubular packaging material may be closed by a closure strap according to the present invention, a first for closing the first end of the tubular packaging material, and, after the package is filled, the second end of the tubular packaging material.

Insertion channel 40 as disclosed in conjunction with FIG. 1, is only one embodiment of the closure strap according to the present invention. It has to be under-stood that insertion channel 40 may have any other suitable form, e.g. channel 40 may have other cross-section shapes than a circular, e.g. an elliptical or rectangular shape. It is important for channel 40 that it terminates at the inside of closure strap 1 in order to guide insertion end 14 of stripe portion 10 to the inside of closure strap 1 when in the closed configuration.

In the case, that insertion channel 40 has an other cross-section than a circular; naturally, stripe portion 10 has a cross section corresponding to the cross-section of insertion channel 40.

Closure strap 1 is made of a deformable and/or elastic material, e.g. a suitable plastic material, and the like.

The invention claimed is:

1. A closure strap for closing packages having a bag-shaped or tubular form, in particular for closing sausage-shaped packages, like sausages, comprising a strap body having a length including an elongated stripe portion having a first end and a second end, and an insertion portion having a first end, a second end and an insertion channel, wherein the second end of the insertion portion is connected with the first end of the stripe portion, and wherein the second end of the stripe portion forms an insertion end for being inserted into an insertion opening of the insertion channel of the insertion portion in an insertion direction with the insertion opening being at the first end of the insertion portion, and wherein the second or insertion end of the stripe portion and the insertion channel including the insertion opening thereof have a substantially round cross section corresponding to each other to allow the insertion end to be inserted into the insertion opening along an axis of the channel in different rotary orientations of the insertion end relative to the insertion opening, wherein the insertion channel terminates in an exit opening which is arranged at the second end of the insertion portion spaced from the insertion opening at the insertion portion first end along the length of the strap body so that the channel extends along the strap body length and which is directed to the inner surface of the closure strap that is to face the package to be closed.

2. The closure strap according to claim 1, wherein second end of the insertion portion is connected to the first end of the stripe portion by a curved portion in an undeformed, open configuration of the closure strap.

3. The closure strap according to claim 2, wherein the insertion end of the stripe portion has an outer end radius mating the inner radius of the curved portion.

4. The closure strap according to claim 1, wherein the insertion portion includes a first surface positioned at its first end.

5. The closure strap according to claim 4, wherein a first end of the insertion channel coincides with the first surface of the insertion portion.

6. The closure strap according to claim 1, wherein the stripe portion comprises at least in the region of the insertion end notches on its outer surface.

7. The closure strap according to claim 1, wherein counter notches are provided at the inner surface of the insertion channel.

8. The closure strap according to claim 1, wherein the stripe portion has a substantially elliptical cross section.

9. The closure strap according to claim 1, wherein the stripe portion and the insertion end have different cross-sections.

10. The closure strap according to claim 1 wherein the insertion channel has an elongate configuration.

11. The closure strap according to claim 1 wherein the strap body has an elongate annular wall portion extending about the insertion channel.

12. The closure strap according to claim 11 wherein the stripe portion has a stripe region that includes the insertion end and that has notches on an outer surface of the stripe region, and the elongate annular wall has an interior and counter notches exposed in the interior that are configured to mate with the notches.

13. The closure strap according to claim 1 wherein the strap body has opposite free ends with one of the opposite free ends corresponding to the second or insertion end of the stripe portion and the other one of the opposite free ends corresponding to the first end of the insertion portion with the insertion opening opening to the other one of the opposite free ends.

14. The closure strap according to claim 13 wherein the insertion opening has the axis of the insertion channel extending therethrough and lengthwise along the strap body.

15. The closure strap according to claim 1 wherein the insertion opening and the exit opening have respective axes extending therethrough and transverse to one another so that the openings face in different directions.

16. The closure strap according to claim 1, wherein the insertion portion extends about the insertion opening and has an inner end portion for facing the package to be closed and at which the exit opening is formed.

17. A closure strap for closing packages having a bag-shaped or tubular form, in particular for closing sausage-shaped packages, like sausages, comprising a strap body having a length including an elongated stripe portion having a first end and a second end, and an insertion portion having a first end, a second end and an insertion channel, wherein the second end of the insertion portion is connected with the first end of the stripe portion, and wherein the second end of the stripe portion forms an insertion end for being inserted into an insertion opening of the insertion channel of the insertion portion in an insertion direction with the insertion opening being at the first end of the insertion portion, and wherein the insertion channel terminates in an exit opening which is arranged at the second end of the insertion portion spaced from the insertion opening at the insertion portion first end along the length of the strap body so that the channel extends along the strap body length and which is directed to the inner surface of the closure strap that is to face the package to be closed, and wherein the insertion opening has an axis extending therethrough and lengthwise along the strap body, and wherein an outer surface of the stripe portion has notches, the insertion portion has notches exposed in the channel thereof, and an inner surface of the stripe portion is smooth and free of notches.

18. A closure strap for closing packages having a bag-shaped or tubular form, in particular for closing sausage-shaped packages, like sausages, comprising a strap body having a length including an elongated stripe portion having a first end and a second end, and an insertion portion having a first end, a second end and an insertion channel, wherein the second end of the insertion portion is connected with the first end of the stripe portion, and wherein the second end of the stripe portion forms an insertion end for being inserted into an insertion opening of the insertion channel of the insertion portion in an insertion direction with the insertion opening being at the first end of the insertion portion, and wherein the insertion channel terminates in an exit opening which is arranged at the second end of the insertion portion spaced from the insertion opening at the insertion portion first end along the length of the strap body so that the channel extends along the strap body length and which is directed to the inner surface of the closure strap that is to face the package to be closed, and wherein the insertion opening and the exit opening have respective axes extending therethrough and transverse to one another so that the openings face in different directions, and wherein the strap body has an elongate annular wall portion extending about the insertion channel, and the elongate annular wall portion has a circumference and extends continuously about the circumference thereof.

19. A closure strap for closing packages having a bag-shaped or tubular form, in particular for closing sausage-shaped packages, like sausages, comprising a strap body having a length including an elongated stripe portion having a first end and a second end, and an insertion portion having a first end, a second end and an insertion channel, wherein the second end of the insertion portion is connected with the first end of the stripe portion, and wherein the second end of the stripe portion forms an insertion end for being inserted into an insertion opening of the insertion channel of the insertion portion in an insertion direction with the insertion opening being at the first end of the insertion portion, and wherein the insertion channel terminates in an exit opening which is arranged at the second end of the insertion portion spaced from the insertion opening at the insertion portion first end along the length of the strap body so that the channel extends along the strap body length and which is directed to the inner surface of the closure strap that is to face the package to be closed, and wherein the strap body has an elongate annular wall portion extending about the insertion channel and which has an inner end portion for facing the package to be closed and at which the exit opening is formed.

\* \* \* \* \*